United States Patent Office 3,356,646
Patented Dec. 5, 1967

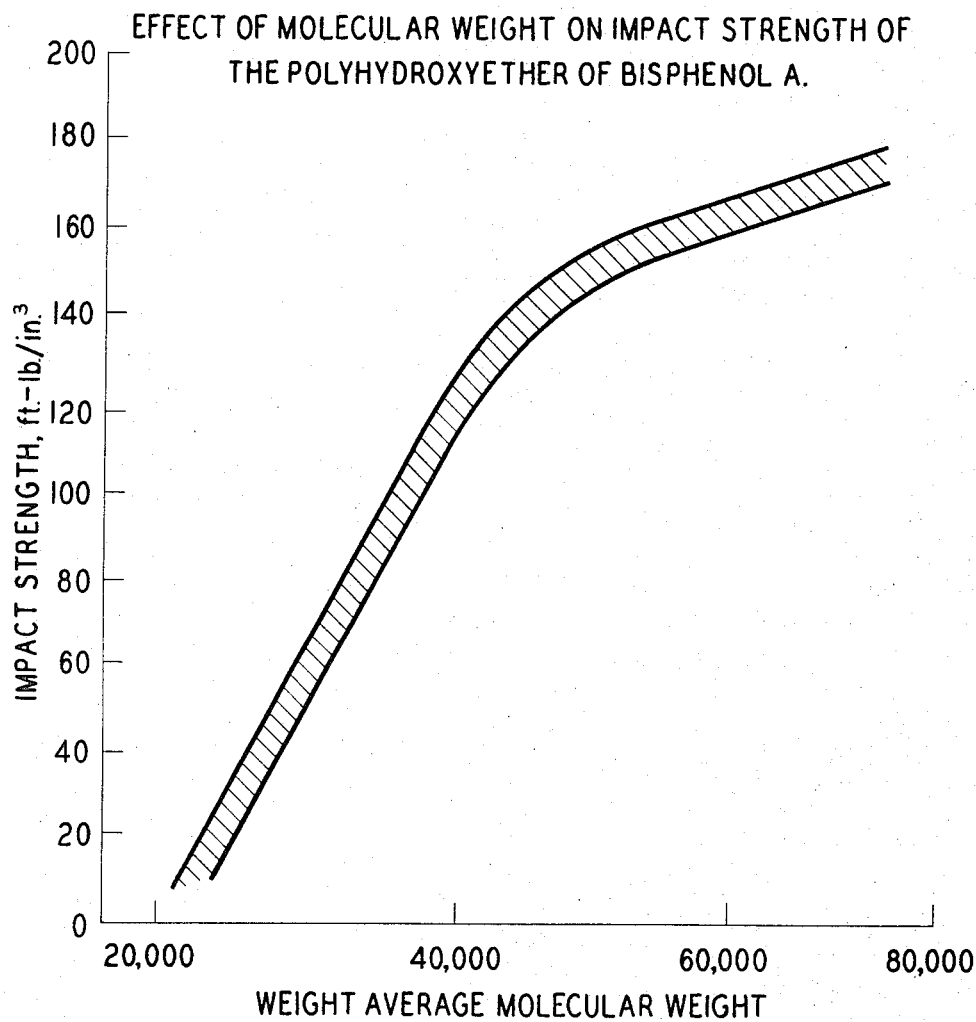

3,356,646
PREPARATION OF HIGH MOLECULAR WEIGHT THERMOPLASTIC POLYHYDROXYETHERS
John Wynstra, Somerville, and Herbert G. Stine, Millington, N.J., assignors to Union Carbide Corporation, a corporation of New York
Filed July 14, 1965, Ser. No. 471,916
19 Claims. (Cl. 260—47)

This invention relates to the preparation of high molecular weight thermoplastic polyhydroxyethers in which resinification is effected very rapidly. More particularly, it relates to a preparation in a simplified reaction medium.

Prior art methods for the preparation of resins by reacting a dihydric polynuclear phenol with an epihalohydrin result in the formation of products ranging from syrupy liquids to brittle solids. For example, 2,2-bis(p-hydroxyphenyl)propane has been reacted with epichlorohydrin, in an alkaline medium, to produce a resin whose structure has been represented by the formula:

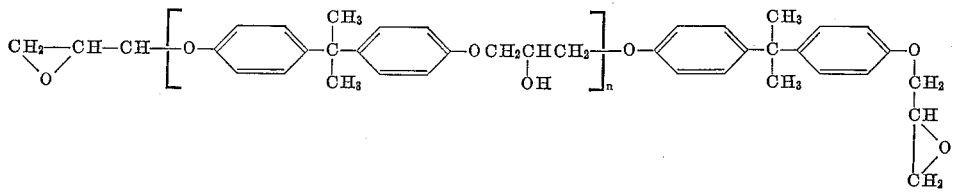

wherein $n$ is an integer having a value of 0 to about 20.

In the series of commercially available resins, prepared by reacting a dihydric polynuclear phenol with an epihalohydrin, whose structure is represented by the formula noted in the preceding paragraph, the highest molecular weight resin is one wherein $n$, as stated, has a value of about 20. These resins, however, suffer the deficiency of being brittle and friable and of not possessing adequate toughness for use in typical plastics applications unless reacted with curing or hardening agents and converted to a thermoset state. Consequently, such resins have found practically no utility in molding applications and in the formation of thin self-sustaining film material.

Somewhat higher molecular weight resins prepared by reacting a dihydric polynuclear phenol with epichlorohydrin have apparently been disclosed by Carpenter et al. in U.S. Patent 2,602,075 issued on July 1, 1952. These resins, although somewhat higher in molecular weight than the thermosetting brittle resins referred to by formula in the preceding paragraph, are still characterized by undesirable properties such as low extensibility, low reduced viscosity and lack of toughness as evidenced by low impact strength.

It has now been found that high molecular weight thermoplastic polyhydroxyethers can be prepared by a method which comprises:

(1) Interacting a dihydric polynuclear phenol, in which the hydroxyl groups are attached to different nuclei, with a substantially equimolar amount of an epihalohydrin per mole of said phenol and an excess over stoichiometric proportions of an alkali metal hydroxide in aqueous solution at the reflux temperature of the mixture until a prepolymer is formed;

(2) Heating the reaction mixture to about 150–180° C. until a polyhydroxyether, having a reduced viscosity of at least 0.45, measured at 25° C. as a 0.2 gram sample in 100 ml. of tetrahydrofuran, and weight average molecular weight of at least about 30,000, is obtained;

(3) Washing said polyhydroxyether with water; and (4) Recovering said polyhydroxyether substantially free of 1,2-epoxy groups.

The figure is a plot of impact strength versus weight average molecular weight of polyhydroxyether of bisphenol A, i.e., 2,2-bis(p-hydroxyphenyl)propane.

The term "thermoplastic polyhydroxyether" herein refers to substantially linear polymers having the general formula:

$$\{D-O-E-O\}_n$$

wherein D is the radical residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic polyhydroxyethers can be prepared by admixing from about 0.975 to about 1.020 moles of an epihalohydrin with one mole of a dihydric phenol together with from about 1.030 to 1.125 moles of an alkali metal hydroxide, such as sodium hydroxide or potassium hydroxide in an aqueous medium at about 60° to about 70° C. The exothermic reaction which ensues is allowed to proceed at the reflux temperature of the mixture until a viscous prepolymer is obtained. The temperature is then raised to 150–200° C. to cause further polymerization to high molecular weight polyhydroxyether, that is, products having a melt flow at 220° C. and 44 p.s.i. of less than about 5 decigrams per minute and preferably from about 0.1 to about 4 decigrams, a reduced viscosity of at least 0.45 and a weight average molecular weight of at least about 30,000. Reduced viscosity values were computed by use of the equation:

$$\text{Reduced viscosity} = \frac{t_s - t_o}{c t_o}$$

wherein $t_o$ is the efflux time of the solvent (tetrahydrofuran), $t_s$ is the efflux time of the polyhydroxyether solution, and $c$ is the concentration of the polyhydroxyether solution in terms of grams of polyhydroxyether per 100 ml. of tetrahydrofuran.

The dihydric phenol contributing the phenol radical residuum D, can be either a dihydric mononuclear phenol or a polynuclear phenol such as those having the general formula:

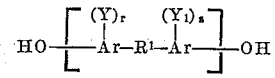

wherein Ar is an aromatic divalent hydrocarbon such as naphthalene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example,

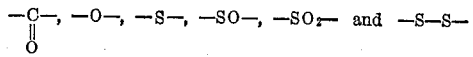

and divalent hydrocarbon radicals huch as alkylene, alkylidene, cycloaliphatic, e.g., cycloalkylene, and cycloalkylidene, halogenated alkoxy or aryloxy substituted alkylene, alkylidene and cycloaliphatic radicals as well as alkarylene and aromatic radicals including halogenated, alkyl, alkoxy or aryloxy susbtituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,2-bis(phenyl)propane,
2,2-bis(4-hydroxyphenyl)-1-phenyl-propane and the like;

Di(hydroxyphenyl)sulfones such as bis(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone and the like;

Di(hydroxyphenyl)ethers such as bis(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols e.g., 1,3-bis(p-hydroxyphenyl)-1-ethylcyclohexane, and the bisphenol reaction products of dipentene or its isomers and phenols such as 1,2-bis(p-hydroxyphenyl)-1-methyl - 4 - isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

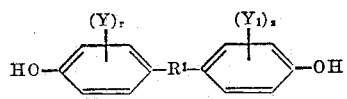

wherein Y and $Y_1$ are as previously defined, $r$ and $z$ have values from 0 to 4 inclusive, and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

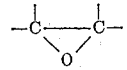

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2-epoxy - 1 - methyl - 3 - chloropropane, 1,2 - epoxy-1-butyl-3-chloropropane, 1,2-epoxy-2-methyl-3-fluoropropane, and the like.

Illustrative diepoxides include diethylene glycol bis-(3,4-epoxycyclohexane-carboxylate), bis-(3,4-epoxycyclohexylmethyl)adipate, bis(3,4 - epoxycyclohexylmethyl)-phthalate, 6-methyl-3,4-epoxycyclohexylmethyl-6-methyl-3,4-epoxycyclohexane carboxylate, 2-chloro-3,4-epoxycyclohexylmethyl - 2 - chloro - 3,4 - epoxycyclohexanecarboxylate, diglycidyl ether, bis(2,3-epoxycyclopentyl)-ether, 1,5-pentanediol bis(6-methyl-3,4-epoxycyclohexylmethyl)ether, bis(2,3-epoxy-2-ethylhexyl)adipate, diglycidyl maleate, diglycidyl phthalate, 3-oxatetracyclo-[4.4.0.1$^{7,10}$.0$^{2,4}$]undec-8-yl 2,3-epoxypropyl ether, bis-(2,3 - epoxycyclopentyl)sulfone, bis(3,4 - epoxyhexoxypropyl)sulfone, 2,2'-sulfonyldiethyl bis(2,3-epoxycyclopentanecarboxylate), 3-oxatetracyclo[4.4.0.1$^{7,10}$.0$^{2,4}$]undec-8-yl 2,3-epoxybutyrate, 4-pentenal-di-(6-methyl-3,4-epoxycyclohexylmethyl)acetal, ethylene glycol bis(9,10-epoxystearate), diglycidyl carbonate, bis(2,3-epoxybutylphenyl)-2-ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of the oxirane group. Such diepoxides having the grouping

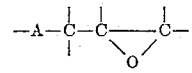

wherein A is an electron donating substituent such as

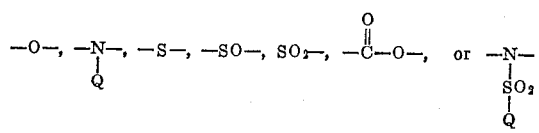

and Q is a saturated carbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether, which, at a temperature of 220° C. and under a pressure of 44 p.s.i., flowed through an orifice having a diameter of 0.0825″ and a length of 0.315″ over a ten minute period. Four such determinations were made and the average of the four determinations is reported as decigrams per minute under a pressure of 44 p.s.i. and at 220° C.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pages 21–25, McGraw-Hill Book Co., Inc., New York (1957). In the first test which involves the reaction of 1,2-epoxy groups with a known amount of hydrochloric acid followed by back-titration of the acid consumed, no hydrochloric acid was consumed. In the second test in which the infrared absorbance at 10.95 and 11.60µ (wave lengths at which 1,2-epoxy groups absorb light) no absorbance was demonstrated by the thermoplastic polyhydroxyethers. Thus, it may be concluded that within the experimental limits of these standard tests, no 1,2-epoxy groups are present in these thermoplastic polyhydroxyethers.

Curing agents, for example, amines, such as imidazole and N,N-dimethylbenzylamine have no curing or hardening effect on thermoplastic polyhydroxyethers in sharp contrast with their effect on liquid or solid epoxy resins which are hardened into thermoset resins with such curing agents.

This invention may be practiced at subatmospheric pressures although it is preferred to use either atmospheric or superatmospheric pressures. Where the preparation of polyhydroxyether is carried out at atmospheric pressure the water initially present can be removed as the exothermic formation of prepolymer occurs. Where superatmospheric pressures are used the water initially present can be left in the reaction mixture and still achieve temperatures of up to 200° C. Autogeneous pressures are convenient superatmospheric pressures.

The reactants can be stirred during the polymerization process if desired, but agitation is not required. Thus, for example, the polymerization can be effected batchwise in a closed pipe or continuously in a plug-flow procedure.

Where agitation is employed, it may be preferred to reduce the viscosity of the polymerizing mass and hence torque on the stirring shaft with a plasticizing diluent especially in polymerizations carried out at atmospheric pressure where the water initially present is allowed to boil out of the reaction zone. Suitable diluents include hydrocarbons such as toluene or xylene, ketones such as methyl isobutyl ketone and chlorinated hydrocarbons which are stable to strong alkali such as trichloroethylene or chlorobenzene.

Reaction time is not critical and can be surprisingly short. Thus, high molecular weight thermoplastic polyhydroxyethers can be prepared in about 30 to 45 minutes, which time includes both the formation of prepolymer and the final polymerization step to yield high polymer. Longer times are not deleterious but are not required.

The effect of the molecular weight of polyhydroxyethers on impact strength was delineated in the figure with a product made from bisphenol A and epichlorohydrin. It can be seen that small changes in molecular weight have large effects on impact strength up to about 45,000. This figure explains the startling difference in physical properties that exists between thermosetting epoxy resins of the prior art which have weight average molecular weights below about 15,000 and the thermoplastic polyhydroxyethers of the present invention and clearly indicates that a difference in kind exists between these two groups of resins.

The following tests were used:

| Tests: | Designation |
|---|---|
| Tensile strength (film) | ASTM D-822-54T. |
| Tensile modulus (film) | Do. |
| Tensile elongation (film) | Do. |

Glass transition temperatures (Tg), commonly referred to as a second order phase transition temperature, refer to the inflection temperatures found by plotting the resilience (recovery from 1 percent elongation), of a film, ranging in thickness from 3–15 mils, against the temperature. A detailed explanation for determining resilience and inflection point is to be found in an article by A. Brown in "Textile Research Journal" volume 25, 1955, at page 891.

The thermoplastic polyhydroxyethers of the present invention, as shown have excellent mechanical properties making such materials desirable for use in a wide variety of applications. For example, their excellent thermal stability allows them to be extruded or otherwise shaped by thermoforming techniques into a multitude of objects such as film, rods, tubing and the like without degradation or without advancing to an unworkable state. The excellent tensile impact strength of the polyhydroxyethers provides articles produced therefrom with excellent resistivity to impact, bending and other such rough usage.

If desired, film produced from the polyhydroxyethers can be biaxially stretched at appropriate temperatures, to effect an orientation of the molecules thereof thus further improving its mechanical properties, as is well known in the art.

In addition to the production of film material and molded articles, the polyhydroxyethers can be used as coatings on such material as aluminum foil, polyethylene, magnetic tapes, and the like as well as used to form laminated structures.

The invention is further illustrated by the examples which follow in which all parts and precentages are by weight unless otherwise specified.

Example 1

One hundred forty-eight and two-tenths grams (0.650 mole) of bisphenol-A and 113.7 grams (0.702 mole, 8% excess over stoichiometric) of 24.69% aqueous NaOH were weighed directly onto a 1-liter, 3-necked round bottom glass flask equipped with mechanical agitation, thermometer and reflux condenser. (NaOH was a water solution which had previously been assayed by titration with standard HCl using bromcresyl purple as indicator). The resulting heavy paste was heated electrically without stirring until enough bisphenol had dissolved to permit agitation (about 50° C.) and then heated with stirring. At 50° C., 60.7 grams (0.650 mole) of 99.1% epichlorohydrin (purity determined by vapor phase chromatography analysis) was added quickly to the bisphenol/NaOH slurry, producing a thinner slurry and initiating an exothermic reaction. Within a few minutes, the reflux temperature (106° C.) was reached, and a separate polymer phase appeared which gained viscosity rapidly. Ten minutes after the addition of epichlorohydrin, the contents of the flask, now a taffy-like mass, was transferred to preheated 4 inch by 3 inch planetary rotor mill equipped with heaters, a material temperature recorder, a Dean-Stark trap and condenser, hot water inlet and outlet ports, a torque measuring and recording device and a vacuum-pressure gauge and which had been pressure-tested to 200 pounds per square inch (p.s.i.). When in the mill, the batch was heated to reflux with agitation and water boiled out using the Dean-Stark trap. When the torque on the mill shaft became so high as to endanger the equipment, 40 cubic centimeters of xylene was added to serve as a plasticizer for the product and permit continued agitation. When the batch temperature reached 120° C., the product was substantially dry and little additional water was removed. Heating was continued at a standardized rate by maintaining a 40° C. differential between the heater settings and the material temperature. During this period, both temperature and torque rose sharply, showing that these forcing conditions were leading to a rapid rate of polymerization. At a predetermined torque end-point, the polymerization was stopped by flooding the reactor with superheated water at 150° C. and 150 p.s.i. pressure; in this example, the end-point was reached at 170° C. and 35 minutes from the initiation of reaction (point at which epichlorohydrin was added). Having stopped the polymerization, the product was purified of excess NaOH and by-product NaCl by washing with superheated fresh water introduced in the bottom of the vessel and removed at the top, the polymer being agitated continually. That washing was removing inorganics was evident from the steady drop in pH from 11 to that of the wash water (pH 6). After a negative chloride ion test (with AgNO$_3$) had been registered and after a total of 6 liters of wash had been collected, washing was stopped. The water remaining in the vessel together with the xylene which had been used as a polymer plasticizer was then flash-evaporated by slowly releasing the pressure, while heating the polymer to about 200° C. to obtain a sufficiently fluid melt to permit agitation. After a brief vacuum-stripping to remove residual xylene and water, the product was discharged, stranded and cut into pellets.

The product was found to have a reduced viscosity of 0.52 deciliter per gram, a melt flow of 1.64 dicigrams per minute. An identical melt flow of 1.64 was obtained after heating the polymer for 20 minutes at 270° C. before running the test, showing the excellent thermal stability of the polymer. A melt flow of 19.2 was measured at 220° C. and 220 p.s.i. pressure, showing the non-Newtonian character of the polymer.

This polymer was compression-molded into 10-mil films and its tensile properties determined in an Instron Tensile Tester:

Tensile modulus, p.s.i. ---------------------- 280,000
Tensile strength, p.s.i. ---------------------- 7,000
Elongation at break, percent ----------------- 15–30
Glass, transition temp., °C ------------------ 105

Its impact strength was measured at 80–160 foot-pounds per cubic inch in a pendulum impact tester (modified ASTM D-256-56).

This polymer was also cast, from chloroform solution, into 1-mil film for testing for extractable material by simulated food solvents.

The extractables test consisted of immersing a film sample of the polyhydroxyether in a simulated "food solvent" a measuring by ultraviolet spectrophotometry the amount of aromatic ethers and phenols which had been extracted from the polyhydroxyether film sample by the solvent.

To carry out the test, 2" x 2" x 1 mil pieces of film of the polyhydroxyether were placed in a container with a volume of simulated food solvent sufficient to give a film surface to solvent volume ratio of 0.5 square per milliliter. The container was then closed and placed in an oven maintained at 57° C. The container was kept in the oven seven days, with agitation twice each day. After this period, the solution was decanted into a ten centimeter ultraviolet absorption cell. The absorbance of the cell was measured relative to a "blank," a cell containing only solvent which had received identical thermal treatment. The level of extractables in the solution was calculated using the extinction coefficient of the 2,2-bis(4-hydroxyphenyl)propane, which was determined on the same instrument. The level of extractables as expressed in parts per million parts of the food solvent, on a weight to volume basis were as follows:

Film from:                                  Example 1
  Water ----------------------------p.p.m-- 0.30
  Heptane --------------------------p.p.m-- 0.29
  10% ethanol ----------------------p.p.m-- 0.55

Lower molecular weight, for example, molding-grade, polyhydroxyether can be obtained by quenching the polymerization at a lower torque end-point. Example 2 illustrates the preparation of such a material.

*Example 2*

The same charge and reaction procedures as in Example 1 were followed with the exception that the polymerization was quenched at a torque end-point which was ⅚ of that of Example 1. The workup procedure was also identical to that of Example 1. Reduced viscosity was 0.45. 220° C./44 p.s.i. melt flow was 5.2; after 20 minutes at 270° C. melt flow was 4.7.

In the following example the order of addition of reactants was changed.

*Example 3*

One hundred forty-eight and two-tenths grams (0.650 mole) of bisphenol-A were weighed into a 1-liter, 3-necked round bottom glass flask, followed by 60.7 grams (0.650 mole) of 99.1% epichlorohydrin and 55 grams of distilled water. This slurry was heated to 70° C. at which temperature it was readily stirrable and 59.2 grams (0.702 mole) of 47.6% aqueous NaOH added in three portions in anticipation of an exothermic reaction. It will be noted that this is the same final composition as Examples 1 and 2. Reaction was exothermic and the boiling point was soon reached. After some 14 minutes of reaction, the viscous polymer/brine suspension was transferred to the preheated planetary rotor mill and the processing technique described in Example 1 followed. The maximum torque found during the latter stages of the reaction period was about one-fourth of that of Example 1. The reaction was carried to 172° C. The final product after melt-washing had a reduced viscosity of 0.28.

The mole ratio of Examples 1 and 2 represents an optimum for making high molecular weight polyhydroxyether.

Higher or lower molecular weights can be obtained by alteration of the excess of alkali metal hydroxide as shown in Examples 4 to 10.

*Example 4*

One hundred forty-eight and two-tenths grams of bisphenol-A (0.650 mole) were weighed into a 1-liter flask, followed by 107.4 grams (0.663 mole) of 24.70% aqueous NaOH. After heating to 70° C., 61.0 grams of 98.6% pure epichlorohydrin was added and the system allowed to go to reflux temperature. After 20 minutes, the pre-polymer/alkaline brine suspension was transferred to a preheated planetary rotor mill. Heating was to 190° C., reached in 48 minutes by distilling out the water of the charge. The molten polymer (plus salt) was very viscous and solvent was added to facilitate agitation. After reaching 190° C. and an apparent constant torque, a sample of the product was freed of salt and excess alkali by solution in dioxane, coagulation in HCl acidified water in a Waring "Blendor" and by water washing of the precipitated polymer in the "Blendor." A reduced viscosity of 0.39 was found on vacuum oven-dried polymer.

Examples 5–10

Examples 5–10 were duplicates of Example 4 except for progressively increased amounts of NaOH. Data and results are summarized in Table I.

TABLE I

| Example | NaOH Charged | | | | Product R.V. |
|---|---|---|---|---|---|
| | Grams | Conc., Percent | Moles | Excess,[1] Percent | |
| 5 | 110.5 | 24.70 | 0.682 | 5.0 | 0.45 |
| 6 | 111.6 | 24.70 | 0.689 | 6.0 | 0.46 |
| 7 | 112.1 | 24.70 | 0.692 | 6.5 | 0.45 |
| 8 | 112.6 | 24.70 | 0.696 | 7.0 | 0.62 |
| 9 | 109.5 | 24.94 | 0.702 | 8.0 | 0.69 |
| 10 | 114.7 | 24.94 | 0.709 | 9.1 | ([2]) |

[1] Over stoichiometric proportions.
[2] Product contained an appreciable gel fraction.

The general procedure of Examples 4 to 10 was used to note the effect of various small excesses of epichlorohydrin on maximum molecular weight while holding excess NaOH over epichlorohydrin at 2.0%.

In Examples 11–13 the effect of alteration of amounts of epichlorohydrin is illustrated. Excess of NaOH was held at 102% of stoichiometric.

Example 11

Example 4 was duplicated with the exception that there was used

| | Grams |
|---|---|
| Bisphenol-A (0.650 mole) | 148.2 |
| NaOH, 24.7% (0.670 mole) | 108.4 |
| Epichlorohydrin, 99.1% (0.6565 mole) | 61.3 |

A product was isolated having a reduced viscosity of 0.44.

Example 12

Example 4 was duplicated with the exception that there was used

| | Grams |
|---|---|
| Bisphenol-A (0.650 mole) | 148.2 |
| NaOH, 24.48% (0.673 mole) | 109.9 |
| Epichlorohydrin, 99.1% (0.660 mole) | 61.6 |

The product had a reduced viscosity of 0.54 and a 220° C. melt flow of 1.7 decigrams/units minute at 44 p.s.i. A compression molded film was found to have the following properties, showing its toughness:

| | |
|---|---|
| Tensile modulus, p.s.i. | 300,000 |
| Tensile strength, p.s.i. | 9,600 |
| Elongation at break, percent | 30 to 40 |
| Pendulum impact, ft.-lb./in.³ | 90 |
| Glass transition temperature, ° C. | 105 |

Example 13

Example 4 was duplicated with the exception that there was used

| | Grams |
|---|---|
| Bisphenol-A (0.650 mole) | 148.2 |
| NaOH, 24.70% (0.676 mole) | 109.5 |
| Epichlorohydrin, 99.1% (0.633 mole) | 61.9 |

The product had a reduced viscosity of 0.67.

Examples 14 and 15 illustrate the effect of the alteration of the amount of bisphenol-A.

Example 14

Example 4 was duplicated using

| | Grams |
|---|---|
| Bisphenol-A (0.666 mole) | 151.9 |
| NaOH, 24.48% (0.7475 mole) | 122.1 |
| Epichlorohydrin, 99.1% (0.650 mole) | 60.7 |

The product has a reduced viscosity of 0.89.

Example 15

Example 4 was duplicated using

| | Grams |
|---|---|
| Bisphenol-A (0.670 mole) | 152.6 |
| NaOH, 24.70% (0.7475 mole) | 121.1 |
| Epichlorohydrin, 99.1% (0.650 mole) | 60.7 |

The product had a reduced viscosity of 0.40.

Examples 16 and 17 shows the use of more dilute NaOH solutions in the present process. In Example 16, a torque end-point was employed to produce a molding-grade resin; in Example 17, the batch was simply run to a high temperature for maximum conversion.

Example 16

To the equipment of Example 1 there was charged

| | Grams |
|---|---|
| Bisphenol-A (0.650 mole) | 148.2 |
| NaOH, 24.03% (0.702 moles) | 116.9 |
| Distilled water [1] | 50.0 |

[1] Calculates to 16.83% NaOH.

which gave an almost clear solution at 60° C. On the addition of 60.7 grams (0.650 mole) 99.1% epichlorohydrin the clear solution remained only for about two minutes, until the temperature reached 83° C. when the precipitation of polymers cause heterogeneity. The polymerization process is evidently exceedingly rapid. For the remainder of the example, the procedure of Example 1 was used. The product had a melt flow of 4.1 dg./min. and after 20 min. at 270° C. a melt flow of 5.0 dg./min.

Example 17

Example 4 was duplicated but using

| | Grams |
|---|---|
| Bisphenol-A (0.650 mole) | 148.2 |
| NaOH, 14.78% (0.702 mole) | 190.0 |
| Epiclorohydrin, 99.1% (0.650 mole) | 61.0 |

The product polymer had a reduced viscosity of 1.06.

The removal of a substantial portion of the brine phase after the early minutes of the reaction is shown in Example 18.

Example 18

To the equipment and in the manner of Example 1 there was charged

| | Grams |
|---|---|
| Bisphenol-A (0.650 mole) | 148.2 |
| NaOH, 24.94% (0.705 mole) | 113.1 |
| Epichlorohydrin, 98.6% (0.650 mole) | 61.0 |

(an excess of 8.5% NaOH stoichiometric). After 10 minutes reaction, as much brine as possible (actually 24.7 grams, 31% of the theoretical yield of 136.8 grams of NaCl, NaOH and $H_2O$) was decanted and discarded. It was estimated that the batch now contained a 5.2% excess of NaOH. The remainder of the batch was transferred to the planetary rotor mill and the reaction finished and the product isolated as described in Example 4. The reduced viscosity of the product was 0.61, a value it will be noted which is much closer to that found earlier for 8% excess NaOH reaction (0.62 in Example 9) than for 5% excess NaOH reaction (0.45 in Example 5). It can be concluded that it is not necessary to retain the aqueous brine phase of the process beyond the first few minutes of the reaction.

In the following example a 5% excess of KOH is employed.

Example 19

Example 4 is duplicated using

| | Grams |
|---|---|
| Bisphenol-A (0.650 mole) | 148.2 |
| KOH, 21.10% (0.682 mole) | 181.5 |
| Epichlorohydrin, 99.1% (0.650 mole) | 60.7 |

The product has a reduced viscosity of 0.52 and melt flow of 2.8.

Example 20

Example 1 was duplicated using:

| | Grams |
|---|---|
| Bisphenol-A (0.299 mole) | 68.2 |
| Disodium salt of bisphenol-A hexahydrate (0.351 mole) | 133.4 |
| Epichlorohydrin, 99.1% (0.650 mole) | 60.7 |
| Distilled water | 60 | which was equivalent to starting with an 8% excess of 25% strength NaOH as in Example 1. A product was obtained having a 220° C./44 p.s.i. melt flow of 2.82. After 20 minutes holding at 270° C., the melt flow value was 2.83, showing the excellent thermal stability of the polymer.

Example 21

The general procedure of Example 1 was used to prepare the polyhydroxyether of the bisphenol of 4-vinyl-cyclohexane (Bisphenol-V).

Example 1 was duplicated using:

| | Grams |
|---|---|
| Bisphenol-V (0.500 mole) | 148.0 |
| NaOH, 24.03% (0.550 mole) | 89.9 |
| Epichlorohydrin, 99.1% (0.500 mole) | 46.7 |

The high glass transition temperature (about 140° C.) of this polymer made it necessary to modify the procedure somewhat in that only a 5-minute reaction was possible before agitation in the flask became impossible. Even the early addition of xylene did not result in normal agitation in the planetary rotor mill until a batch temperature of about 125° C. was reached. Beyond this point, the polymerization was entirely routine and a melt washing caused no trouble. The product made had a 220° C./44 p.s.i melt flow of 1.5.

Example 22

One hundred forty-eight and two-tenths grams (0.650 mole) of bisphenol-A and 115.8 grams (0.718 mole, 9% excess over stoichiometric) of 24.48% aqueous NaOH were weighted directly into a 1-liter, 3-necked round bottomed glass flask equipped with mechanical agitation, thermometer and reflux condenser. (NaOH was a water solution which had previously been assayed by titration with standard HCl using brom-cresyl purple as indicator). The resulting heavy paste was heated electrically without stirring until enough bisphenol had dissolved to permit stirring (about 50° C.) and then heated with stirring. At 60° C. 60.7 grams (0.650 mole) of 99.0% epichlorohydrin (purity determined by vapor phase chromatography analysis) was added quickly, producing a thinner slurry and initiating an exothermic reaction. Within a few minutes the reflux temperature (106° C.) was reached, and a separate polymer phase appeared which gained viscosity rapidly. Ten minutes after the addition of epichlorohydrin, the contents of the flask, now a taffy-like mass, were transferred to a preheated (105° C.) 4-inch by 3-inch planetary rotor mill equipped with heaters, a material temperature recorder, a Dean-Stark trap and condenser, hot water inlet and outlet ports, a torque measuring and recording device and a vacuum-pressure gauge and which had been pressure-tested to 200 p.s.i. When in the mill, the batch was heated to reflux while agitating and water boiled out via the Dean-Stark trap. After 52 cubic centimeters of water (about half of the amount of water originally in the batch) had been collected, the vessel was closed for pressure operation while continuing to heat; the torque immediately fell and temperature started to rise. Heating was continued until a material temperature of 179° C. was recorded and the maximum pressure in the vessel was 100 p.s.i.; the torque on the agitator shaft at this point was less than one-third of that of the melt process at its end-point (see Example 1). At this point, which was reached 45 minutes after the addition of epichlorohydrin which had initiated the polymerization, the reaction cycle was stopped and the washing step started by injecting 150° C. water at 150 p.s.i. into the pressurized vessel. Washing was by passing fresh water in the bottom of the vessel while removing spent water at the top and agitating the polymer continually. A total of 6 liters of wash water was collected; the pH dropped steadily and was the same as that of the original water (pH=6) after 4 liters had been collected. Toward the end of the washing cycle, a negative chloride ion test (to $AgNO_3$) was noted. The polymer was finally isolated by volatilizing the water remaining in the vessel and extruding the product at 203° C. as a strand which was diced into pellets.

This product was found to have a reduced viscosity of 0.52. It has a melt flow of 1.34; after holding 20 minutes at 270° C., the melt flow changed to only 1.17, showing the good thermal stability of the polymer. A compression-molded 10-mil film of the polymer was found to have the following mechanical properties:

| | |
|---|---|
| Tensile modulus, p.s.i. | 270,000 |
| Tensil strength, p.s.i. | 7,600 |
| Elongation at break, percent | 50–120 |
| Pendulum impact, ft.-lbs./in.$^3$ | 100 |
| Glass transition temperature, ° C. | 105–108 |

These properties show this polymer to be high quality polyhydroxyether.

A 1-mil film of this resin cast from chloroform solution was tested for extraction by simulated food solvents and the following results were obtained:

| Film from: | Example 22 |
|---|---|
| Water p.p.m | 0.13 |
| Heptane p.p.m | 0.18 |
| 10% ethanol p.p.m | 0.88 |

The following example illustrates the preparation of a molding-grade polyhydroxyether by the pressure process.

Example 23

Example 22 was duplicated using:

| | Grams |
|---|---|
| Bisphenol-A (0.650 mole) | 148.2 |
| NaOH, 24.03% (0.702 mole) | 116.9 |
| Epichlorohydrin, 99.1% (0.650 mole) | 60.7 |

In this case, no water was distilled out, the gross product (prepolymer, NaCl, NaOH, water) after 10 minutes reaction at atmospheric reflux being heated directly under pressure. After 48 minutes total reaction time, at a temperature of 180° C. and a pressure of 108 p.s.i., the product was melt-washed as described in Example 22. The final product had a melt flow of 6.65; 20 minutes heating at 270° C. changed the melt flow value to 7.26.

In the following example, a high molecular weight, film-grade polymer was made with a more dilute NaOH (all of the water being retained in the reaction vessel) by increasing the excess NaOH slightly (to 10.5%).

Example 24

Example 23 was duplicated using:

| | Grams |
|---|---|
| Bisphenol-A (0.650 mole) | 148.2 |
| NaOH, 15.06% (0.718 mole) | 190.8 |
| Epichlorohydrin, 99.0% (0.650 mole) | 60.8 |

The product polymer had a melt flow of 0.52. Its good thermal stability was indicated by the measurement of a melt flow of only 0.69 after 20 minutes of holding at 270° C.

Example 25

Example 23 was duplicated using approximately a 12% stoichiometric excess of NaOH. The charge was

| | Grams |
|---|---|
| Bisphenol-A (0.650 mole) | 148.2 |
| NaOH, 14.78% (0.728 mole) | 197.0 |
| Epichlorohydrin, 99.0% (0.650 mole) | 60.7 |

The product polymer had a melt flow of 0.51. The melt flow changed to only 0.67 after 20 minutes at 270° C.

An intermediate molecular weight polymer was made by employing a 9% excess of a 15% strength NaOH in

Example 26

Example 23 was duplicated using

| | Grams |
|---|---|
| Bisphenol-A (0.650 mole) | 148.2 |
| NaOH, 14.78% (0.708 mole) | 191.7 |
| Epichlorohydrin, 99.0% (0.650 mole) | 60.7 |

The product polymer had a melt flow of 3.42.

A lower molecular weight (molding-grade) polymer was made by using the formulation of Example 24 (M.F.=0.52) and by stopping the pressure reaction at a lower temperature in

Example 27

The charge, same as Example 24, was

| | Grams |
|---|---|
| Bisphenol-A (0.650 mole) | 148.2 |
| NaOH, 15.06% (0.718 mole) | 190.8 |
| Epichlorohydrin, 99.0% (0.650 mole) | 60.17 |

The reaction was not allowed to go above 155° C. (total reaction time—36 minutes) before the melt-washing step was started. A product having a 5.2 melt flow was obtained which was changed to only 4.5 after holding 20 minutes at 270° C. Example 24 melt flow was 0.52; after holding at 270° C. for 20 minutes, 0.69.

Example 28

Repeating the preceding example as closely as possible (155° C. reached in 43.5 minutes total reaction time) gave a product of 8.1 melt flow. After heating 20 minutes at 270° C. the melt flow was 7.2.

Examples 29 to 33 illustrate the effect of solvents on the pressure process. With one exception the formulas used are modifications on the formula of Example 24.

Example 29

The following charge:

| | Grams |
|---|---|
| Bisphenol-A (0.650 mole) | 148.2 |
| Denatured ethanol | 70.0 |
| NaOH, 24.48% (0.728 mole) | 119.0 |
| Epichlorohydrin, 99.0% (0.650 mole) | 60.7 | which provides for a 12% excess of NaOH over stoichiometric, was added to the reactor in the above order; the polymerization was carried to completion using the technique of Example 23. A polymer of 2.40 melt flow was produced; the melt flow value after 20 minutes at 270° C. was 2.34.

Example 30

The following charge:

| | Grams |
|---|---|
| Bisphenol-A (0.650 mole) | 148.2 |
| NaOH, 15.06% (0.718 mole) | 190.8 |
| Epichlorohydrin, 99.0% (0.650 mole) | 60.7 |
| Butanol | 75 | which is identical to that of Example 24 except for the addition of butanol, was polymerized in the same manner as the charge of Example 24, except that the solvent was added to the batch (estimated reduced viscosity=0.1) upon transfer from flask to planetary rotor mill. Reaction was carried to 180° C. (maximum pressure, 170 p.s.i.) and the product was washed as in Example 24. During the washing, it was obvious that most, if not all, of the butanol was washed out of the polymer. The isolated polymer had a melt flow of 4.61; and 4.56 after holding 20 minutes at 270° C.

Example 31

Example 30 was duplicated except that an equal weight of xylene was substituted for butanol. Reaction was again carried to 180° C. and 170 p.s.i. maximum pressure. In this case because of the very low solubility of xylene in water (only 1 gram per liter at 150° C.), very little xylene was washed out of the resin so that the polymer solution remained rather fluid throughout the whole washing period. The final product had a melt flow of 2.25.

A compression-molded 10-mil film of this product was found to possess the following mechanical properties:

| | |
|---|---|
| Tensile modulus, p.s.i. | 260,000 |
| Tensile strength, p.s.i. | 7,300 |
| Elongation at break, percent | 65 |
| Pendulum impact strength, ft.-lbs./in.$^3$ | 75 |
| Glass transition temp., ° C. | 105–108 |

Example 32

Example 30 was duplicated except that an equal weight of methyl isobutyl ketone was substituted for the butanol of Example 30. A maximum pressure of 152 p.s.i. was measured at 180° C. The final product had a melt flow of 2.45.

Example 33

Example 30 was duplicated except that an equal weight of dimethoxyethane was substituted for the butanol of Example 30. The reaction was not carried above 172° C. because of the high pressure (185 p.s.i.) found with this more volatile solvent. The final product had a melt flow of 12.0; a value of 19.0 was measured after holding at 270° C. for 20 minutes.

Example 34

Example 30 was duplicated except that, immediately after the addition of butanol and prior to closing the reactor for pressure operation, the water contained in the charge was distilled out of the batch as its azeotrope with butanol (separating and removing the heavier aqueous layer and continually returning the upper butanol layer). About 2 hours of heating (at 93 to 129° C.) were required to complete this dehydration step. The reactor was then closed for pressure operation and the batch heated to 182° C. and 79 p.s.i. After washing, a product was isolated having a melt flow of 20.2; the melt flow was 21.8 after 20 minutes at 270° C.

Examples 35 and 36 demonstrate that it is not necessary to agitate the contents of the pressure reactor in this part of the process in order to advance efficiently to high molecular weight.

Example 35

The following charge:

| | Grams |
|---|---|
| Bisphenol-A (0.650 mole) | 136.8 |
| NaOH, 17.64% (0.663 mole)[1] | 150.5 |
| Water[1] | 27.0 |
| Epichlorohydrin, 99.1% (0.600 mole) | 56.0 |

[1] Calculates to 15.0% NaOH.

was used to prepare a prepolymer in the usual manner. A stirred reaction was initiated at 60° C. by the addition of epichlorohydrin, and heating at reflux (102° C.) was continued for 10 minutes. The non-wetting brine-in-polymer suspension, which was just becoming viscous enough to make agitation difficult, was then poured into a 1-inch inner diameter by 24-inch long stainless steel, steam-jacketed pipe equipped with a thermocouple to measure the material temperature and a pressure gauge. By means of threaded pipe caps, the pipe was then sealed for pressure operation and its jacket connected to a high pressure steam line. Because of the discontinuous nature of the experiment, about 35 minutes were required to transfer the batch from the flask to the pipe and to connect the steam to the jacket. The pipe contents, now at 55° C., was heated gradually so that 180° C. was reached in 50 minutes; the maximum pressure was 122 p.s.i. The pressure was then released by means of cooling water on the jacket; the solid plug of resin was drilled from the pipe. That it had advanced considerably in molecular weight was obvious from its toughness compared to a sample taken directly from the flask. A small amount of each sample was dissolved in dioxane and coagulated in water in a Waring "Blendor." The bulk of the pipe reaction product, however, was melt-washed in the planetary rotor mill, following the technique described in detail in Example 22.

The following results were found:

Sample: Reduced viscosity
From flask _____ 0.11
From pipe _____ 0.88
Melt-washed _____ 0.83

Polymer at 0.8 reduced viscosity is much too high in molecular weight to determine a melt flow value at 220° C.

*Example 36*

The same charge and procedure as in Example 35 was used except that the pipe reaction was terminated when the material temperature had reached 160° C. The maximum pressure was 83 p.s.i. and total reaction time was 46 minutes. In this case, the solid plug of polymer could be pulled from the pipe as a unit, showing that the suspension had remained non-wetting throughout the pressure reaction; the walls of the pipe were also found to be clean.

The plug of resin was then sawed into small pieces and melt-washed in the planetary rotor mill. The final product possessed a melt flow of 1.12 which was reduced to 0.90 after 20 minutes at 270° C. This film grade polymer was compression-molded into 10-mil film on which the following properties were obtained:

Tensile modulus, p.s.i. _____ 285,000
Tensile strength, p.s.i. _____ 7,700
Elongation at break, percent _____ 40–165
Pendulum impact strength, ft.-lb./in.$^3$ _____ 96
Glass transition temp., ° C. _____ 105

The aqueous alkaline wash from the melt-washing was acidified to see if high molecular weight might have been obtained at the expense of an inefficient utilization of the bisphenol charged, but only a faint cloud was found. It was concluded, therefore, that the lack of agitation had not resulted in more than the usual trace of unreacted bisphenol-A.

*Example 37*

In order to demonstrate the effect of reduced viscosity and molecular weight of thermoplastic polyhydroxyethers made from bisphenol-A and epichlorohydrin with aqueous sodium hydroxide on pendulum impact strength, the data shown in Table II were compiled.

TABLE II

| Pendulum Impact Strength, ft.-lbs./in.$^3$ | R.V.[a] | Mw[b] |
|---|---|---|
| 10 | 0.33–0.36 | 22,000–23,500 |
| 20 | 0.34–0.37 | 23,000–25,500 |
| 40 | 0.38–0.41 | 26,000–28,000 |
| 60 | 0.42–0.44 | 29,000–31,500 |
| 80 | 0.45–0.48 | 32,500–35,000 |
| 100 | 0.49–0.52 | 36,000–37,500 |
| 120 | 0.52–0.55 | 38,000–41,000 |
| 140 | 0.57–0.62 | 43,000–47,000 |
| 160 | 0.68–0.76 | 53,500–63,000 |
| 180 | 0.88 | 75,000 |

[a] Reduced viscosity 0.2 g. samples in 100 ml. of tetrahydrofuran at 25° C.
[b] Weight average molecular weight.

In order to demonstrate clearly the difference between the thermoplastic polyhydroxyethers used in the present invention and conventional epoxy resins the following curing or hardening experiments were performed.

*Example 38*

Ten grams of Epon 1009 (a solid epoxy resin derived from bisphenol-A, 2,2-bis(p-hydroxyphenyl)propane, and epichlorohydrin available from Shell Chemical Co. and having a degree of polymerization of about 20) was admixed with 0.1 g. of imidazole in a 6 inch test tube. The test tube was clamped in an oil bath at 250° C. for 20 minutes. Within a few minutes the mixture began to gell into a typical cured or hardened epoxy resin.

*Example 39*

Ten grams of a thermoplastic polyhydroxyether derived from bisphenol-A and epichlorohydrin having a reduced viscosity of 0.53 when measured at 25° C. (0.2 g. sample in 100 ml. of tetrahydrofuran) was admixed with 0.1 g. of imidazole in a 6 inch test tube. The test tube was clamped in an oil bath at 250° C. for 20 minutes. No gelation took place and the thermoplastic polyhydroxyether was recovered unchanged indicating that no curing or hardening had taken place. The reduced viscosity of the polyhydroxyether after this test was 0.54 when measured as shown above.

*Example 40*

The procedure described in Example 38 was repeated with one exception, viz., N,N-dimethylbenzylamine was substituted for the imidazole. The Epon 1009 again began to gell in a few minutes into a typical cured or hardened epoxy resin.

*Example 41*

Example 39 was repeated with the exception that N,N-dimethylbenzylamine was substituted for the imidazole. The thermoplastic polyhydroxyether before treatment with the amine had a reduced viscosity of 0.53 at 25° C. (0.2 g. sample in 100 ml. of tetrahydrofuran). No gelation took place even after 20 minutes and the polyhydroxyether after recovery from the test tube had a reduced viscosity of 0.52 when measured as described above.

Although the invention has been described in its preferred forms with a certain degree of particularity, it is understood that the percent disclosure has been made only by way of example and that numerous changes may be made without departing from the spirit and scope of the invention.

What is claimed is:
1. Method for the preparation of thermoplastic polyhydroxyethers which comprises:
    (1) interacting a dihydric polynuclear phenol in which the hydroxyl groups are attached to different nuclei with a substantially equimolar amount of an epihalohydrin per mole of said phenol and an excess over stoichiometric proportions of an alkali metal hy- droxide in aqueous solution at the reflux temperature of the mixture until a prepolymer is formed;

(2) heating the reaction mixture to about 150–200° C. until a polyhydroxyether having a reduced viscosity of at least 0.45, measured at 25° C. as a 0.2 gram sample in 100 ml. of tetrahydrofuran, and a weight average molecular weight of at least about 30,000 is obtained;

(3) washing said polyhydroxyether with water; and (4) recovering said polyhydroxyether substantially free of 1,2-epoxy groups.

2. Method for the preparation of thermoplastic polyhydroxyethers which comprises:

(1) interacting a dihydric phenol in which the hydroxyl groups are attached to different nuclei with from about 0.975 to about 1.020 moles of an epihalohydrin per mole of said phenol and from about 1.030 to about 1.1250 moles of an alkali metal hydroxide in aqueous solution at the reflux temperature of the mixture until a prepolymer is formed;

(2) heating the reaction mixture to about 150–200° C. until a polyhydroxyether having a reduced viscosity of at least 0.45, measured at 25° C. as a 0.2 gram sample in 100 ml. of tetrahydrofuran, and a weight average molecular weight of at least about 30,000 is obtained;

(3) washing said polyhydroxyether with water; and (4) recovering said polyhydroxyether substantially free of 1,2-epoxy groups.

3. Method claimed in claim 1 wherein the dihydric polynuclear phenol has the general formula

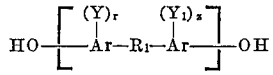

wherein Ar is an aromatic divalent hydrocarbon, Y and $Y_1$ are each selected from the class consisting of alkyl radicals, alkoxy radicals and halogen atoms, r and z are integers having a value from 0 to a maximum value corresponding to the number of hydrogen atoms on Ar which can be replaced by substituents and $R_1$ is a divalent radical.

4. Method claimed in claim 1 wherein the dihydric polynuclear phenol has the general formula

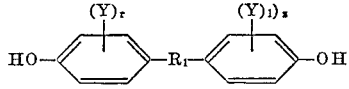

wherein Y and $Y_1$ are each selected from the class consisting of alkyl radicals, alkoxy radicals and halogen atoms, r and z are integers having a value from 0 to 4 and $R_1$ is a member selected from the class consisting of alkylene groups and alkylidene groups.

5. Method claimed in claim 4 wherein $R_1$ has from 1 to 3 carbon atoms.

6. Method claimed in claim 4 wherein the dihydric polynuclear phenol is 2,2-bis(p-hydroxyphenyl)propane.

7. Method claimed in claim 1 wherein the epihalohydrin has the general formula

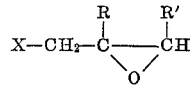

wherein each of R and R' are selected from the class consisting of hydrogen and methyl groups and X is a halogen atom.

8. Method claimed in claim 7 wherein the epihalohydrin is epichlorohydrin.

9. Method claimed in claim 7 wherein the epihalohydrin is epibromohydrin.

10. Method claimed in claim 1 wherein the alkali metal hydroxide is sodium hydroxide.

11. Method claimed in claim 1 wherein water is removed from the reaction mass after the prepolymer has formed and a plasticizing amount of liquid hydrocarbon is added.

12. Method claimed in claim 1 wherein the reaction is carried out under autogeneous pressure.

13. Method claimed in claim 1 wherein the reaction mass is agitated during the reaction.

14. Method claimed in claim 1 wherein the prepolymer is formed at a temperature up to about 100° C.

15. Method claimed in claim 1 wherein the thermoplastic polyhydroxyether is prepared under autogenous pressure with agitation.

16. Method claimed in claim 1 wherein the thermoplastic polyhydroxyether is prepared without agitation in a plug-flow system.

17. Method claimed in claim 1 wherein the thermoplastic polyhydroxyether is prepared with agitation in the presence of a plasticizing diluent.

18. Method claimed in claim 17 wherein water is removed from the system after the polyhydroxyether prepolymer is formed.

19. Method claimed in claim 17 wherein the plasticizing diluent is xylene.

No references cited.

WILLIAM H. SHORT, *Primary Examiner.*

T. D. KERWIN, *Assistant Examiner.*